United States Patent
Suzuki

(10) Patent No.: US 9,068,525 B2
(45) Date of Patent: Jun. 30, 2015

(54) ENGINE CONTROL METHOD

(75) Inventor: Takanori Suzuki, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 228 days.

(21) Appl. No.: 13/554,706

(22) Filed: Jul. 20, 2012

(65) Prior Publication Data

US 2013/0024095 A1     Jan. 24, 2013

(30) Foreign Application Priority Data

Jul. 22, 2011   (JP) ................. 2011-160590

(51) Int. Cl.
*B60T 7/12*     (2006.01)
*F02D 41/14*    (2006.01)
*F02D 41/08*    (2006.01)
*F02D 41/24*    (2006.01)
*F02D 41/30*    (2006.01)
*F02D 41/00*    (2006.01)

(52) U.S. Cl.
CPC .......... *F02D 41/1497* (2013.01); *F02D 41/083* (2013.01); *F02D 2250/24* (2013.01); *F02D 2200/1006* (2013.01); *F02D 41/2441* (2013.01); *F02D 41/2451* (2013.01); *F02D 41/30* (2013.01); *F02D 41/0002* (2013.01); *Y02T 10/42* (2013.01)

(58) Field of Classification Search
CPC . F02D 11/105; F02D 41/083; F02D 41/2451; F02D 2200/1006; F02D 2250/24
USPC .......... 701/103, 104, 105, 110, 112; 123/436, 123/339.16–339.18
See application file for complete search history.

(56) References Cited

U.S. PATENT DOCUMENTS 4,606,313 A * 8/1986 Izumi et al. ................... 123/386
6,020,651 A * 2/2000 Nakamura et al. .......... 290/40 R
(Continued)

FOREIGN PATENT DOCUMENTS

DE   10 2008 041 710 A1   4/2009
EP   1 491 751 A1         12/2004
EP   1 978 225 A1         10/2008
(Continued)

OTHER PUBLICATIONS

Extended European Search Report for corresponding EP Patent Application No. 12176063.1 dated Nov. 29, 2012.
(Continued)

*Primary Examiner* — Lindsay Low
*Assistant Examiner* — Robert Werner
(74) *Attorney, Agent, or Firm* — Sughrue Mion, PLLC

(57) ABSTRACT

Embodiments of the present invention include an engine control method for controlling an engine having an accessory. In the method, a relationship between a torque of the accessory and a controlled variable corresponding to each rotational speed of the engine is stored in advance. An estimated value of the controlled variable is calculated based on a calculated value of the torque of the accessory and the engine rotational speed by reference to the said relationship. A command value of the controlled variable is calculated based on at least one of the engine rotational speed, opening of a throttle, opening of an accelerator and an air supply pressure. A calculated difference is determined by comparing the estimated value of the controlled variable and the command value of the controlled variable.

10 Claims, 6 Drawing Sheets

(56) References Cited

U.S. PATENT DOCUMENTS

2009/0320461 A1* 12/2009 Morinaga et al. ............... 60/431
2010/0332102 A1* 12/2010 Akiyama et al. ............... 701/99

FOREIGN PATENT DOCUMENTS

| JP | 10-159637 A | 6/1998 |
| JP | 10-288070 A | 10/1998 |
| JP | 2001-132529 A | 5/2001 |
| JP | 2001-219766 A | 8/2001 |
| JP | 2005-180185 A | 7/2005 |
| JP | 2010-048153 A | 3/2010 |
| WO | 2011/073755 A1 | 6/2011 |
| WO | WO 2011073755 A1 * | 6/2011 |
| WO | WO 2011145532 A1 * | 11/2011 |

OTHER PUBLICATIONS

Communication dated Jun. 3, 2014, issued by the Japanese Patent Office in corresponding Application No. 2011-160590.

* cited by examiner

ENGINE CONTROL METHOD

This application claims priority to Japanese patent application serial number 2011-160590, the contents of which are incorporated herein by reference.

BACKGROUND OF THE INVENTION

1. Field of the Invention

The present invention relates to an engine control method.

2. Description of the Related Art

Japanese Laid-Open Patent Publication 10-288070 discloses a technique for controlling the amount of fuel injection in a diesel engine. In this technique, the fuel injection is controlled so that the rotational speed of the engine is maintained at a targeted numerical value. This speed is maintained even when a load is applied to the engine (such as that of an accessory such as an air conditioner or a power steering system). An idling state may be detected based on the output of a switch. The switch detects the fully closed position of an accelerator. The fuel injection amount is corrected based on the input conditions of various parameters such that the rotational speed of the engine in its idling state is maintained at a fixed value. Any error in the fuel injection amount can be calculated based on the deviation between the corrected fuel injection amount and the actual amount of fuel injection. In this technique, the fuel injection amount in an operational range other than the idling state may also be corrected.

In the above-mentioned conventional technique, however, a correction amount of fuel injection amount is calculated only during an idling state, and the correction amount is decided based on map data which is predetermined using measurements from other operating conditions. Accordingly, the correction amount is not sufficient for use in an operational range outside of the idling phase. Particularly, the difference between a command value of corrected fuel injection and an actual amount of fuel injection is large at the time of transition during engine operation. Accordingly the air/fuel ratio largely deviates from a target air/fuel ratio and thus deteriorates the exhaust gas. Accordingly, there is a need for an engine control method where the difference between a control command value and an actual control value can be detected in an operational range outside of an idling state.

SUMMARY OF THE INVENTION

Embodiments of the present invention include engine control method for controlling an engine having an accessory. In this method, a relationship between a torque of the accessory and a controlled variable corresponding to the rotational speed of the engine is stored in advance. An estimated value of the controlled variable may be determined based on a calculated value of the torque of the accessory and the engine rotational speed. A command value of the controlled variable may be calculated based on at least one of the: engine rotational speed, opening of a throttle, opening of an accelerator and/or an air supply pressure. The difference between the estimated value of the controlled variable and the command value of the controlled variable is then calculated.

According to this method, the difference between the command value of the controlled variable and the actual value of the controlled variable can be detected during an operational range outside of the idling state.

DETAILED DESCRIPTION OF THE INVENTION

Each of the additional features and teachings disclosed above and below may be utilized separately or in conjunction with other features and teachings to provide improved engine control methods. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

One embodiment of the present invention is explained in conjunction with FIGS. 1 to 5. A forklift truck according to the embodiment may include a gasoline engine and a hydraulic pump as an accessory for cargo handling. The drive torque of the hydraulic pump may be expressed by the following relationship (1).

$$\text{Drive torque of hydraulic pump} = \text{Capacity of hydraulic pump} \times \text{Discharge pressure of hydraulic pump} \times \text{speed increasing ratio} / (200\Pi \times \text{pump efficiency}) \quad (1)$$

Accordingly, the drive torque of the hydraulic pump can be calculated by measuring the discharge pressure of the hydraulic pump. The output torque of the engine of a cargo handling operation while the forklift truck is stopped may be established by the following relationship (2).

$$\text{Output torque of engine} = \text{Drive torque of hydraulic pump} \quad (2)$$

Figure 1:
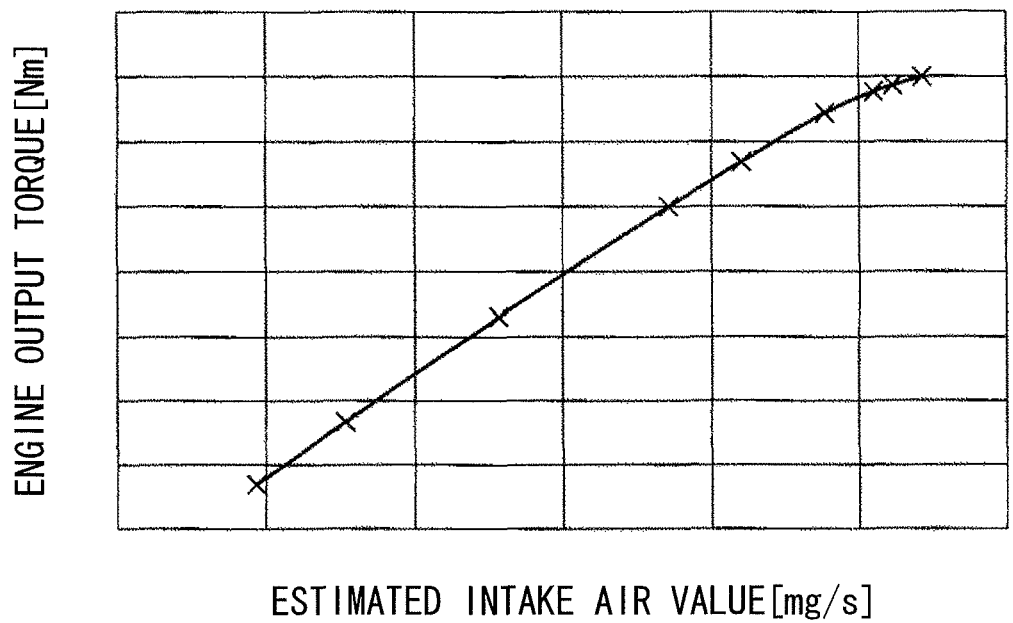
FIG. 1 is a graph showing the relationship between an estimated intake air amount and the engine output torque.
Figure 2:
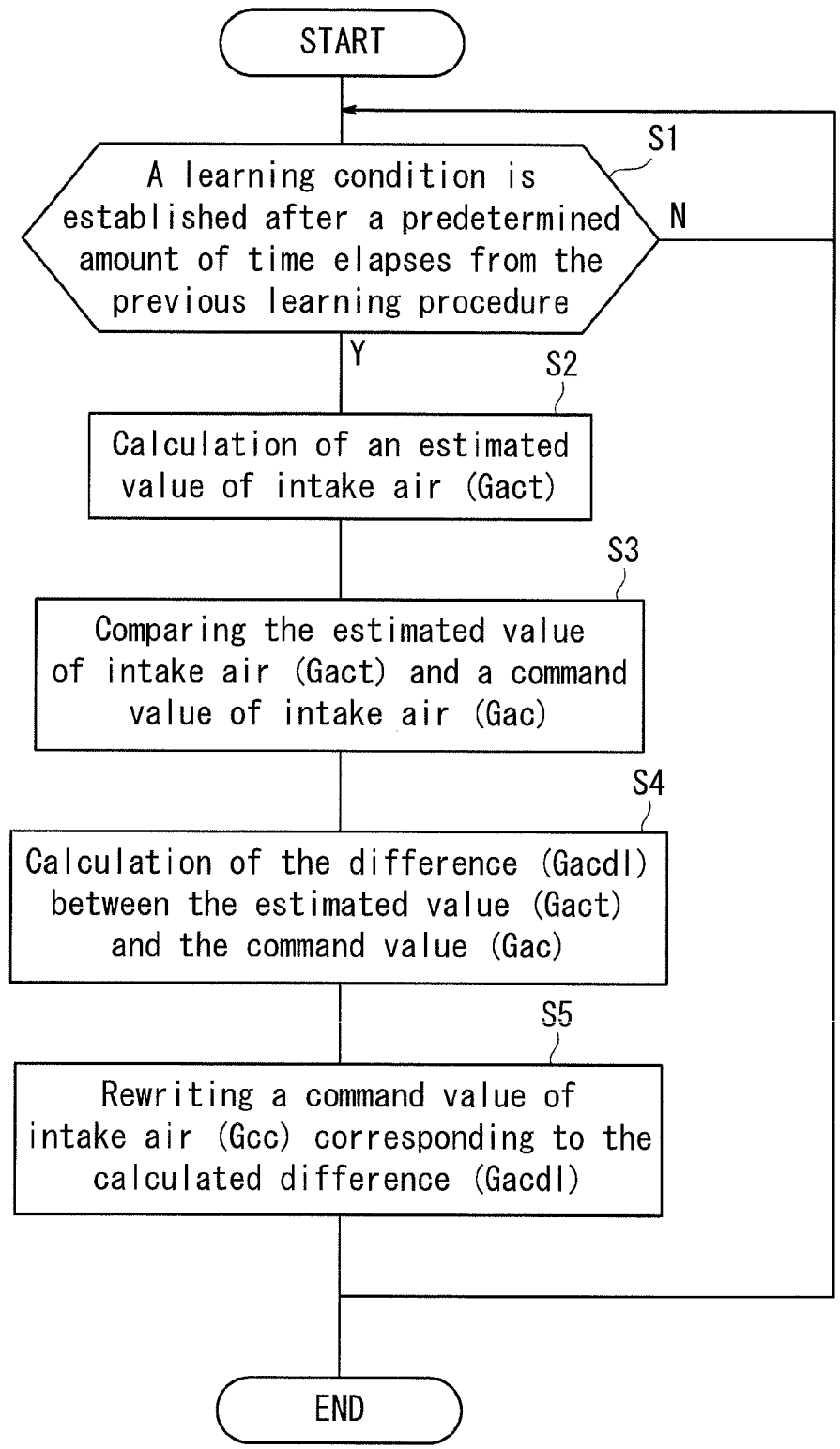
FIG. 2 is a flow chart of an engine control method.
Figure 7:
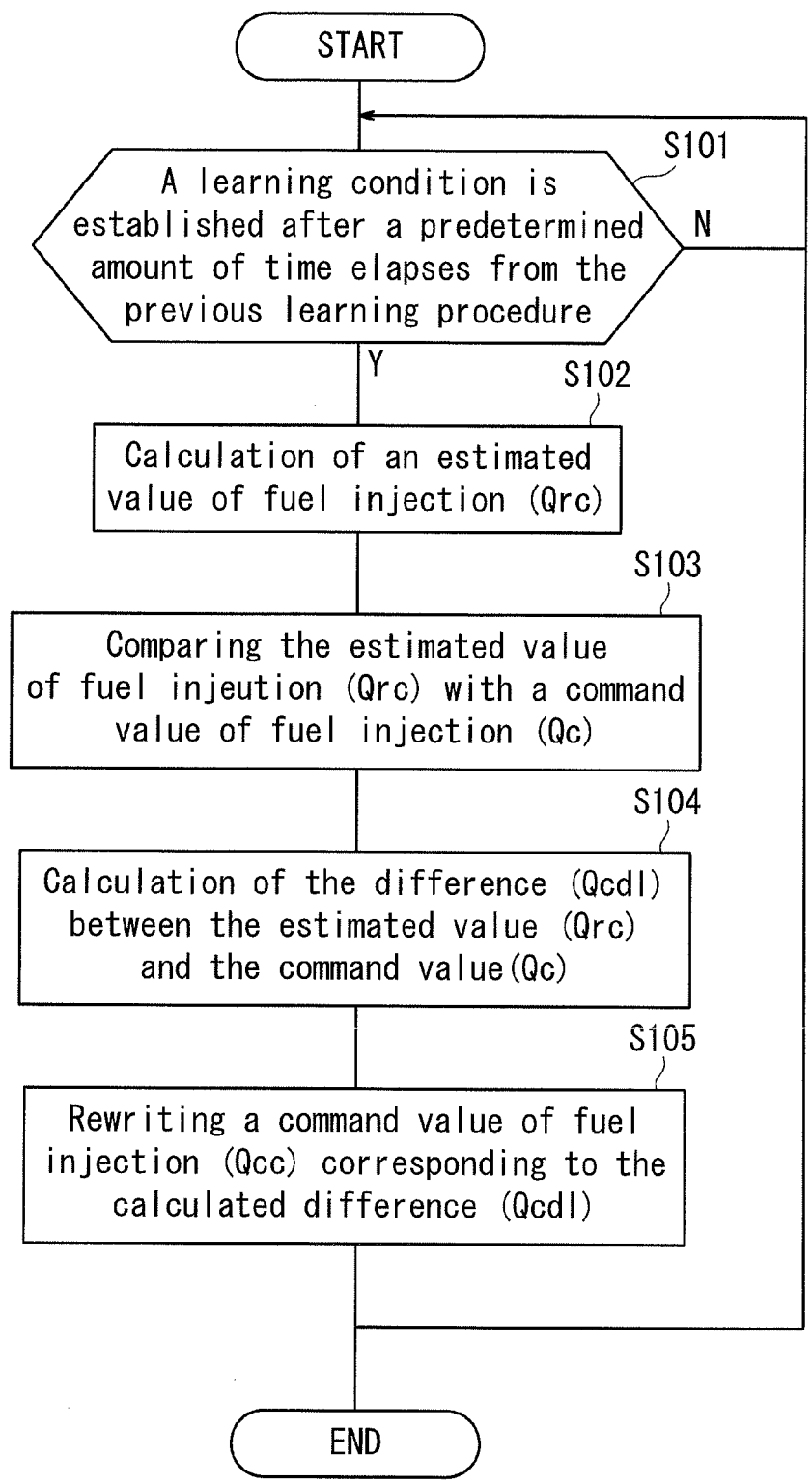
FIG. 7 is a flow chart of an engine control method of the second embodiment.

The output torque of the engine may also include a friction torque of the engine. The friction torque of the engine may stored in advance by an electronic control unit (ECU). This friction torque can be calculated based on rotational speed and oil temperature. Accordingly, the friction torque of the engine may be omitted from the formula (2). The relationship between the output torque of the engine and the intake air amount the output torque of the engine and the intake air amount (a controlled variable) may be stored in advance by the ECU as a plurality of maps corresponding to a plurality of rotational speeds. The flow charts in FIGS. 2 and 7 represent an executable program logic for the ECU to perform control. FIG. 1 shows an example of a relationship between engine output torque and the intake air amount at 1000 rpm.

The intake air amount may be calculated based on engine rotational speed, degree of throttle opening and/or intake pressure of an intake manifold. This calculation is typically conducted on a gasoline engine that does not incorporate an airflow meter.

A method of controlling the above-mentioned gasoline engine is explained in conjunction with FIGS. 2 to 5. The ECU determines whether or not a predetermined time elapses from the previous learning procedure and thereby establishes a learning condition (step S1). The case where the learning condition is established is a case where only an accessory which can be estimated is driven and the learning condition is equal to the setting condition in an initial state stored by the ECU. In such a situation, it is unnecessary to take into account the friction torque of the engine. For example, the learning condition may be established when a stopped forklift truck moves its cargo and a condition, for example, oil temperature is equal to the condition in an initial state.

When the learning condition is established (YES in S1), an estimated value of intake air (Gact) is calculated based on a calculated value of a drive torque of the hydraulic pump and an engine rotational speed (Ne) by reference to the map (see FIG. 3) (step S2). The map (see FIG. 3) shows a drive torque of the hydraulic pump and an intake air amount at an engine rotational speed in an initial state.

In step S1, when the determination is NO, the learning procedure is temporarily stopped. The determination in step S1 is repeated until a predetermined time elapses from the previous learning procedure and the learning condition is established.

Next, the ECU compares the estimated value of intake air (Gact) with a command value of intake air (Gac) (step S3). The command value of intake air (Gac) can be calculated based on the map. The map shows the relationship between engine rotational speed and the opening amount of the throttle. The map is established in advance by an experiment or the like.

Figures 3, 4, 5:
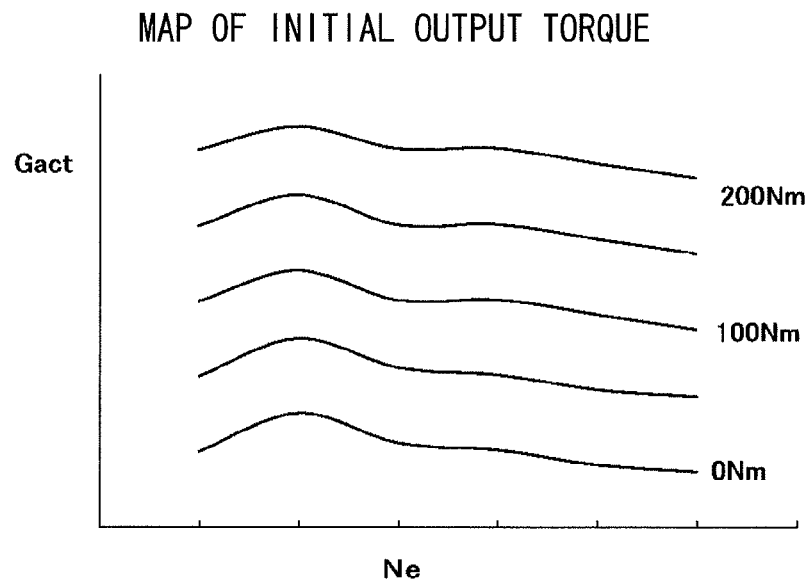
FIG. 3 is an initial output torque map.
FIG. 4 is a command corrected value map for intake air before rewriting.
FIG. 5 is the command corrected value map for intake air after rewriting.

Next, the ECU calculates the difference acquired by the comparison of the estimated value and the command value of intake air (Gacd=Gac−Gact) (step S4). As shown in FIGS. 4 and 5, the map is rewritten corresponding to the difference (step S5). The map shows command corrected values of intake air (Gcc) at each command value of intake air (Gac) and at each engine rotational speed (Ne). Hereinafter, steps S1 to S5 are repeated each time the learning condition is established.

To be more specific, the map in FIG. 4 includes the amounts at the command values of intake air (Gac) and the engine rotational speed (Ne) before the learning procedure. The values in the map are updated with respect to the calculated difference (Gacdl), and the values are stored as command corrected values of intake air (Gcc) as shown in FIG. 5. Also in the any subsequent learning procedure, the command corrected values of intake air (Gcc) are updated and stored in the map in the same manner.

Accordingly, the map for calculating the command corrected values of intake air (Gcc) are updated each time a learning procedure is performed. An initial value of each command corrected value of intake air (Gcc) is 0 in all lattices of the map. The ECU calculates final calculated values of intake air (Gacf) by adding the command corrected values of intake air (Gcc) to the command values of intake air (Gac) or by subtracting the command corrected values of intake air (Gcc) from the command values of intake air (Gac) after the learning procedure.

The ECU calculates a fuel injection amount (or injection time) and ignition timing or the like based on a result of the final calculated values of intake air (Gacf). That is to say, the ECU adds a correction amount to the command value thereof Due to such operations, the ECU calculates a final fuel injection value and final ignition timing and electronically controls them. This learning procedure occurs under conditions where a command value of intake air (Gac) is larger than 2 mg/s and equal to or less than 4 mg/s and where an engine rotational speed (Ne) is larger than 3000 rpm and equal to or less than 4000 rpm.

As described above, in the method of controlling an engine having an accessory, the relationship between the torque of the accessory and a controlled variable (for example, intake air amount) corresponding to each rotational speed of the engine is stored in advance. An estimated value of the controlled variable is calculated based on a calculated value of the torque of the accessory and the engine rotational speed by reference to the above-mentioned relationship. A command value of the controlled variable may be calculated based on at least one of the: engine rotational speed, degree of opening of the throttle, degree of opening an accelerator and/or an air supply pressure (for example, an engine rotational speed and opening of a throttle). The difference may be obtained by comparing the estimated value and the command value.

According to this method, the difference between the command value of the controlled variable and the actual value of the controlled variable can be detected even in an operational range other than the idling phase.

The engine is preferably a gasoline engine. The controlled variable is preferably an amount of intake air. An estimated amount value of intake air may be calculated based on a map showing a calculated torque value of an accessory and a rotational speed of the engine (refer to FIG. 3). A command value of intake air may be calculated based on a map showing engine rotational speed and degree of throttle opening. A command corrected value of intake air is calculated based on the difference between the command value of intake air and the estimated value of intake air. A final calculated value of intake air can be determined by adding the command corrected value of intake air to the command value of intake air or by subtracting the command corrected value of intake air from the command value of intake air.

According to this method, in the gasoline engine, a gap between a command amount of intake air and an actual amount of intake air can be made small. Accordingly, in an operational range other than idling, the engine can be controlled in accordance with an actual vehicle state.

Control of the gasoline engine may be performed as described above. Accordingly, a drive torque of the hydraulic pump can be calculated based on a discharge pressure of the hydraulic pump. An estimated amount of intake air may be calculated based on the drive torque. Accordingly, by repeating the learning procedure under different conditions, a preferable correction amount can be acquired even during an operational range outside of the idling phase. Accordingly, a gap between a command value of intake air and an actual value of intake air can be made small. Further, an engine control, which follows an actual vehicle state, can be performed without using an airflow meter so that deterioration of exhaust properties can be prevented.

For example, there is a possibility that an intake air amount is decreased due to irregularities in the diameter of an intake system part such as a valve opening. Alternatively, the intake system may get clogged or there may be a pressure loss in an air cleaner element or the like. Even when the intake air amount is decreased, a gap between a command value of intake air and an actual value of intake air can be made small. Also, when an intake air amount is restored due to the removal of the above-mentioned cause, the gap between the command value of intake air and the actual value of intake air can be made small. Accordingly, the engine can be preferably controlled in accordance with the actual amount of intake air. Due to such control, a lowering of the total load torque can be also prevented. Further, the deterioration of the exhaust gas can be prevented.

Further, even when an actual amount of fuel injection is increased or decreased compared to a command value due to the deterioration of an injector, irregularities among injectors or the like, the engine is controlled such that the gap between the actual amount of fuel injection and the command value is small. Accordingly, the deterioration of the exhaust gas can be prevented. Further, a desired torque corresponding to an operation of the engine can be generated.

In place of the configuration shown in FIGS. 1 to 5, the configuration shown in FIGS. 6 to 10 may be adopted. The configuration shown in FIGS. 6 to 10 is a control method in a diesel engine in place of a gasoline engine. A forklift truck having the configuration shown in FIGS. 6 to 10 includes a diesel engine, and a hydraulic pump which constitutes an accessory for a lifting operation.

Figure 6:
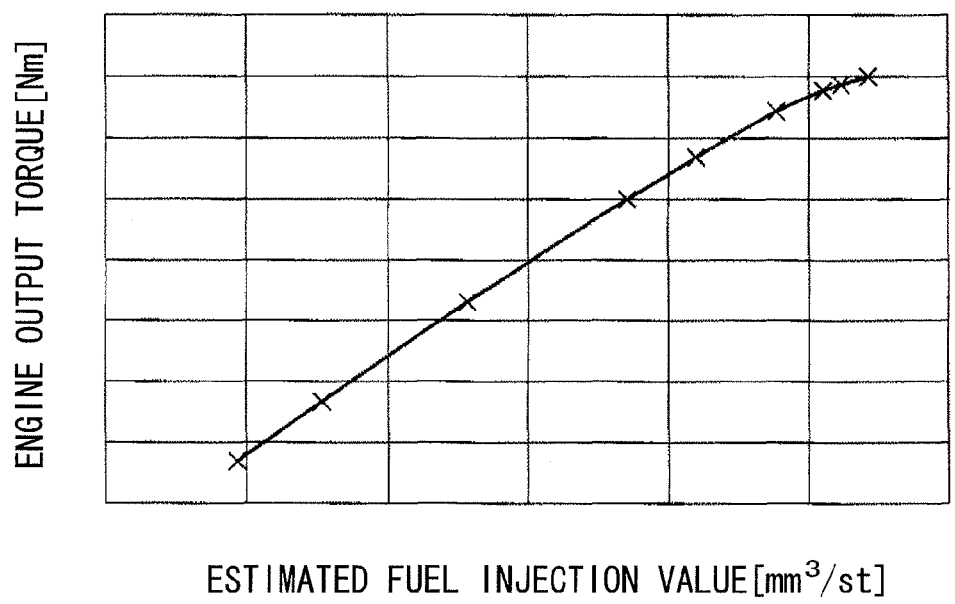
FIG. 6 is a graph showing the relationship between an estimated fuel injection amount and the engine output torque of a second embodiment.

The above-mentioned relationship expressed by (1) is also established with respect to a drive torque of a hydraulic pump. The above-mentioned relationship expressed by (2) is also established with respect to an output torque of the engine. The relationship between an output torque of the engine and an amount of fuel injection is stored in advance by an ECU as a plurality of maps. The amount of fuel injection is preferably a controlled variable. The maps preferably correspond to a plurality of rotational speeds. FIG. 6 shows the relationship between an output torque of the engine and an amount of fuel injection at 1000 rpm. A command amount of fuel injection of the diesel engine is not directly measured, and the command amount can be calculated based on a fuel pressure such as a common rail pressure and an energization time of a fuel injection valve.

Figures 8, 9, 10:
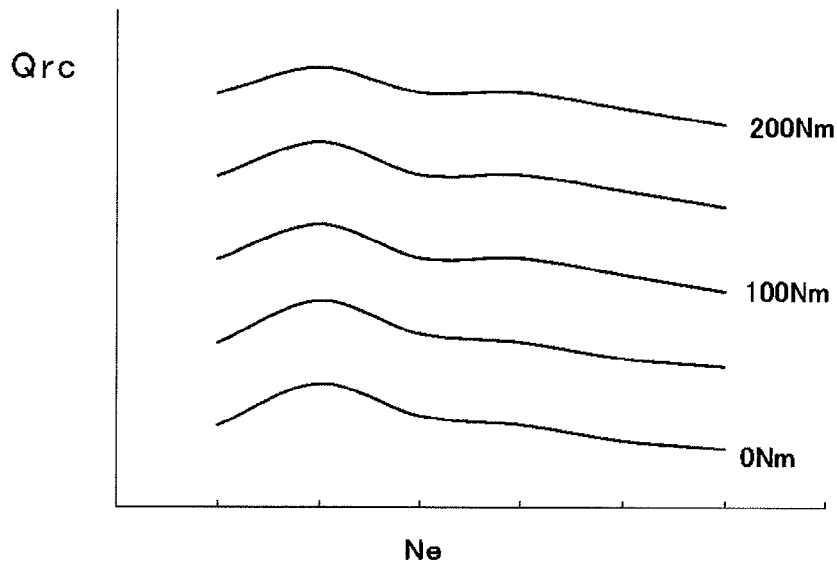
FIG. 8 is an initial output torque map of the second embodiment.
FIG. 9 is a command corrected value map for intake air before rewriting.
FIG. 10 is the command corrected value map for intake air after rewriting.

A method of controlling the diesel engine is explained in conjunction with FIGS. 7 to 10. First, the ECU determines whether or not a predetermined time elapses from the previous learning procedure and a learning condition is established (step S101). When the learning condition is established (YES in step S101), an estimated value of fuel injection (Qrc) is calculated based on a calculated value of drive torque of the hydraulic pump and engine rotational speed (Ne) by reference to the map (see FIG. 8) (step S102). The map of FIG. 8 shows a drive torque of the hydraulic pump and a fuel injection amount at an engine rotational speed in an initial state. In step S101, when the determination is NO, the learning procedure is temporarily stopped, and the determination step S101 is repeated until a predetermined time elapses from the previous learning procedure and the learning condition is established.

Next, the ECU compares the calculated estimated value of fuel injection (Qrc) and a command value of fuel injection (Qc). The command value of fuel injection (Qc) is calculated based on the map showing the engine rotational speed and degree of throttle opening with each other (step S103). Next, the ECU calculates the difference acquired by the comparison of the estimated value and the command value (Qcdl=Qc− Qrc) (step S104). As shown in FIG. 9, the map shows command corrected values of fuel injection (Qcc) at any command values of fuel injection (Qc) and at any engine rotational speeds (Ne). The command corrected values of fuel injection (Qcc) are rewritten corresponding to the calculated differences (S105). Hereinafter, steps S101 to S105 are repeated each time the learning condition is established.

The map of FIG. 9 shows the command corrected amount values of fuel injection (Qcc) corresponding to the command values of fuel injection (Qc) and the engine rotational speeds (Ne) before the learning procedure is performed. The command corrected values of fuel injection (Qcc) are updated corresponding to the calculated difference (Qcdl) as shown in FIG. 10. Also in the subsequent learning procedures, the command corrected values of fuel injection (Qcc) are updated and stored in the map in the same manner.

Accordingly, the map for calculating the command corrected values of fuel injection (Qcc) are updated each time learning procedure is performed. An initial value of command corrected value of fuel injection (Qcc) is 0 in all lattices of the map. The ECU calculates the final calculated value of fuel injection (Qcf) by adding the command corrected value of fuel injection (Qcc) to the command value of fuel injection (Qc) or by subtracting the command corrected value of fuel injection (Qcc) from the command value of fuel injection (Qc). The ECU calculates an increased/decreased value of energization time of the fuel injection valve as a corrected value. Thus, the fuel injection corresponding to the final calculated value of fuel injection (Qcf) can be performed. The ECU performs an electronic control of the fuel injection valve. Current learning procedures are performed under conditions where a command value of fuel injection (Qc) is larger than 10 mm$^3$/st and equal to or less than 20 mm$^3$/st and an engine rotational speed (Ne) is larger than 3000 rpm and equal to or less than 4000 rpm.

As described above, the engine is preferably a diesel engine. A controlled variable may be a fuel injection amount. As shown in FIG. 8, an estimated amount of fuel injection may be calculated based on a map showing a calculated value of a torque of an accessory and a rotational speed of the engine. A command value of fuel injection is calculated based on a map showing an engine rotational speed and degree of throttle opening. A command corrected value of fuel injection is calculated based on the difference between the command value of fuel injection and the estimated value of fuel injection. A final calculated value of fuel injection can be determined by adding the command corrected value of fuel injection to the command value of fuel injection or by subtracting the command corrected value of fuel injection from the command value of fuel injection.

According to this method, in the diesel engine, a gap between a command value of fuel injection and an actual value of fuel injection can be made small. Accordingly, a desired torque corresponding to an operation of the engine can be generated.

A control of the diesel engine is performed as described above. Accordingly, a discharge pressure of the hydraulic pump is always measured and a drive torque of the hydraulic pump can be calculated based on the discharge pressure. An estimated amount of fuel injection may be calculated based on the drive torque. Due to such an operation, by repeating the learning procedure under different conditions, a preferable correction amount can be acquired in operational ranges outside of the idling phase.

Accordingly, a gap between a command value of fuel injection and an actual value of fuel injection can be made small. For example, there is a possibility that the actual amount of fuel injection is increased or decreased with respect to the command value due to the deterioration of an injector, irregularities in the manufacture of the injector or the like. Even when the fuel injection amount is increased or decreased, a gap between an actual amount of fuel injection and a command value of fuel injection can be made small. Accordingly, it may prevent the unintentional increase or decrease of torque of the engine. Thus, it may prevent the deterioration of the exhaust gas.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

As shown in FIGS. 1 to 5, an estimated value of intake air amount may be calculated based on an engine rotational speed and a torque of an accessory. A command value of intake air may be calculated based on the engine rotational speed and the degree of throttle opening. The difference may be obtained by comparing the estimated value and the command value with each other. A command corrected value of intake air may be corrected on the basis of the calculated difference. In place of such a method, an estimated value of an internal pressure of an intake manifold may be calculated based on an engine rotational speed and a torque of an accessory. A command value of the internal pressure of the intake manifold may be calculated based on the engine rotational speed and degree of throttle opening. The difference may be obtained by comparing the estimated value and the command value. A command corrected amount value of internal pressure may be corrected on the basis of the difference. In place of the difference, the command corrected value may be corrected on the base of a ratio. The ratio may be calculated by comparing the estimated value and the command value. For example, the command corrected value may be corrected by multiplying the ratio. In place of the method shown in FIGS. 6 to 10, the above-mentioned method may be also used.

As described above, the ECU may electronically control the fuel injection amount and ignition timing based on a result of a final calculated value of intake air (Gacf). Alternately the ECU may electronically control the opening of the throttle.

As described above, the accessory may be a hydraulic pump for a cargo handling operation. Alternately the accessory may be another accessory which is driven by an engine. The accessory may be a power generator whose torque can be calculated based on rotational speed, voltage, current and/or efficiency. The accessory may be also a power steering operated by a hydraulic pump. The control method of the present invention is also applicable to a compressor. The compressor may be used in an air conditioner where discharge pressure of a refrigerant is measurable.

This invention claims:

1. An engine control method for controlling an engine with an accessory, comprising the steps of:
    establishing a learning condition after a predetermined period from a previous learning has elapsed during a cargo handling operating through using the accessory driven by the engine while a car that travels by the engine is stopped;
    storing in advance, in an electronic control unit including program logic, a relationship between a torque of the accessory and a controlled variable corresponding to each rotational speed of the engine;
    after the learning condition is established, calculating, by the electronic control unit, an estimated value of the controlled variable based on a calculated value of the torque of the accessory and the engine rotational speed by reference to the relationship;
    calculating, by the electronic control unit, a command value of the controlled variable based on at least one of the engine rotational speeds, a degree of throttle opening, degree of accelerator opening and an air supply pressure;
    calculating, by the electronic control unit, a difference by comparing the estimated value of the controlled variable and the command value of the controlled variable;
    calculating, by the electronic control unit, a final value of the controlled variable based on the difference between the estimated value and the command value; and
    controlling the engine using the final value of the controlled variable, in an operational range other than an idling state.

2. The engine control method of claim 1 wherein:
    the engine is a gasoline engine,
    the controlled variable is an amount of intake air,
    the estimated value of intake air is calculated on a map showing the relationship, the command value of intake air is calculated based on a map showing the engine rotational speed and the degree of the throttle opening,
    a command corrected value of intake air is calculated based on the difference between the command value of intake air and the estimated value of intake air, and
    a final calculated value of intake air is calculated by adding the command corrected value of intake air to the command value of intake air or by subtracting the command corrected value of intake air from the command value of intake air.

3. The engine control method of claim 1 wherein:
    the engine is a diesel engine,
    the controlled variable is a fuel injection amount,
    the estimated value of fuel injection is calculated based on a map showing the said relationship,
    the command value of fuel injection is calculated based on a map showing the engine rotational speed and the opening of the throttle,
    a command corrected value of fuel injection is calculated based on the difference between the command value of fuel injection and the estimated value of fuel injection, and
    a final calculated value of fuel injection is calculated by adding the command corrected value of fuel injection to the command value of fuel injection or by subtracting the command corrected value of fuel injection from the command value of fuel injection.

4. The engine control method of claim 1, further comprising:
    rewriting, by the electronic control unit including program logic, the stored relationship between the torque of the accessory and the controlled variable corresponding to each rotational speed of the engine based on the calculated difference.

5. An engine control method for controlling a gasoline engine with a hydraulic pump as an accessory, the engine control method comprising the steps of:
    storing in advance, in an electronic control unit including program logic, a relationship between a torque of the accessory and an amount of intake air corresponding to each rotational speed of the engine;
    establishing a learning condition after a predetermined period from a previous learning procedure has elapsed during a cargo handling operation through using the accessory driven by the engine while a car that travels by the engine is stopped;

after the learning condition is established, calculating, by the electronic control unit, an estimated value of the amount of intake air based on a calculated value of the torque of the accessory and the engine rotational speed by reference to the relationship;

calculating, by the electronic control unit, a command value of the amount of intake air based on at least one of the engine rotational speeds, a degree of throttle opening, degree of accelerator opening and an air supply pressure;

calculating, by the electronic control unit, a difference by comparing the estimated value of the amount of intake air and the command value of the amount of intake air;

calculating, by the electronic control unit, a command corrected value of the amount of intake air based on the difference;

calculating, by the electronic control unit, a final value of the amount of intake air by adding the command corrected value of the amount of intake air to the command value of the amount of intake air or by subtracting the command corrected value of the amount of intake air from the command value of the amount of intake air; and controlling the engine using the final value of the amount of intake air.

6. The engine control method of claim 5 wherein:
the estimated value of intake air is calculated on a map showing the relationship, and
the command value of the amount of intake air is calculated based on a map showing the engine rotational speed and the degree of the throttle opening.

7. The engine control method of claim 5, further comprising:
rewriting, by the electronic control unit including program logic, the stored relationship between the torque of the accessory and the amount of intake air corresponding to each rotational speed of the engine based on the calculated difference.

8. An engine control method for controlling a diesel with a hydraulic pump as an accessory, the engine control method comprising the steps of:
storing in advance, in an electronic control unit including program logic, a relationship between a torque of the accessory and a fuel injection amount corresponding to each rotational speed of the engine;

calculating, by the electronic control unit, an estimated value of the fuel injection amount based on a calculated value of the torque of the accessory and the engine rotational speed by reference to the relationship;

calculating, by the electronic control unit, a command value of the fuel injection amount based on at least one of the engine rotational speeds, a degree of throttle opening, degree of accelerator opening and an air supply pressure;

calculating, by the electronic control unit, a difference by comparing the estimated value of the fuel injection amount and the command value of the fuel injection amount;

calculating, by the electronic control unit, a command corrected value of the fuel injection amount based on the difference;

calculating, by the electronic control unit, a final value of the fuel injection amount by adding the command corrected value of the fuel injection amount to the command value of the fuel injection amount or by subtracting the command corrected value of the fuel injection amount from the command value of the fuel injection amount; and controlling the engine using the final value of the fuel injection amount, during a cargo handling operation while a car with the engine is stopped.

9. The engine control method of claim 8, further comprising:
establishing a learning condition after a predetermined period from a previous learning procedure has elapsed during a cargo handling operation through using the accessory driven by the engine while a car that travels by the engine is stopped; and
after the learning condition is established, calculating, by the electronic control unit, the estimated value of the fuel injection amount.

10. The engine control method of claim 8, further comprising:
rewriting, by the electronic control unit including program logic, the stored relationship between the torque of the accessory and the fuel injection amount corresponding to each rotational speed of the engine based on the calculated difference.

* * * * *